United States Patent
Cui et al.

(10) Patent No.: US 11,956,654 B2
(45) Date of Patent: Apr. 9, 2024

(54) METHOD AND APPARATUS FOR SEARCHER RESOURCE SHARING FOR MEASUREMENT WITHOUT MEASUREMENT GAP

(71) Applicant: APPLE INC., Cupertino, CA (US)

(72) Inventors: Jie Cui, Cupertino, CA (US); Hong He, Cupertino, CA (US); Dawei Zhang, Cupertino, CA (US); Chunhai Yao, Beijing (CN); Chunxuan Ye, San Diego, CA (US); Haitong Sun, Cupertino, CA (US); Weidong Yang, San Diego, CA (US); Wei Zeng, Cupertino, CA (US); Yuchul Kim, Cupertino, CA (US); Yushu Zhang, Beijing (CN); Zhibin Wu, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 341 days.

(21) Appl. No.: 17/593,108

(22) PCT Filed: Dec. 15, 2020

(86) PCT No.: PCT/CN2020/136588
§ 371 (c)(1),
(2) Date: Sep. 9, 2021

(87) PCT Pub. No.: WO2021/159852
PCT Pub. Date: Aug. 19, 2021

(65) Prior Publication Data
US 2022/0191720 A1     Jun. 16, 2022

(51) Int. Cl.
*H04W 24/08*     (2009.01)
*H04L 5/00*     (2006.01)

(52) U.S. Cl.
CPC .......... *H04W 24/08* (2013.01); *H04L 5/0048* (2013.01)

(58) Field of Classification Search
CPC .... H04W 24/08; H04W 24/10; H04L 5/0048; H04L 5/0007; H04L 5/001; H04L 5/0058; H04L 5/0053
See application file for complete search history.

(56) References Cited

U.S. PATENT DOCUMENTS

| | | |
|---|---|---|
| 2019/0274146 A1 | 9/2019 | Tang et al. |
| 2020/0037283 A1 | 1/2020 | Edge et al. |

(Continued)

FOREIGN PATENT DOCUMENTS

CN     109803304 A     5/2019

OTHER PUBLICATIONS

Ericsson, "Introduction of NR-U in CSSFoutside_gap and CSSFwithin_gap requirements",, R4-1914653, 3GPP TSG-RAN WG4 Meeting #93, Reno, Nevada, USA, Nov. 14-18, 2019, 9 pages.

(Continued)

*Primary Examiner* — Tejis Daya
(74) *Attorney, Agent, or Firm* — Dorsey & Whitney LLP

(57) ABSTRACT

Methods and apparatus are provided for searcher resource coordination between NR mobility based measurement and LTE (E-UTRA) PRS based measurement without measurement gap in EN-DC mode or NE-DC mode. Other embodiments are also provided for searcher resource coordination between NR PRS measurement and LTE (E-UTRA) PRS measurement without measurement gap in EN-DC mode or NE-DC mode. Further embodiments provide for searcher resource coordination between NR or LTE (E-UTRA) PRS measurement and NR mobility measurement without measurement gap in EN-DC mode or NE-DC mode.

20 Claims, 8 Drawing Sheets

PRIORITIZE PRS BASED MEASUREMENT OVER MOBILITY BASED MEASUREMENT IF PRS PERIODICITY IS GREATER THAN A FIRST THRESHOLD VALUE, OR IF PRS PERIODICITY IS EQUAL TO THE FIRST THRESHOLD VALUE AND ONE OR MORE PRS OCCASIONS ARE MUTED

DO NOT PRIORITIZE PRS BASED MEASUREMENT OVER MOBILITY BASED MEASUREMENT IF PRS PERIODICITY IS SMALLER THAN A SECOND THRESHOLD VALUE, OR IF PRS PERIODICITY IS EQUAL TO THE SECOND THRESHOLD VALUE AND NONE OF ONE OR MORE PRS OCCASIONS ARE MUTED

(56) References Cited

U.S. PATENT DOCUMENTS

2021/0360570 A1* 11/2021 Manolakos ........... G01S 1/0428
2022/0046444 A1* 2/2022 Manolakos ........... H04L 5/0091
2022/0057474 A1* 2/2022 Duan ................. H04L 27/2613

OTHER PUBLICATIONS

Ericsson, "Meeting minutes intra/inter frequency measurement, gap sharing and interRAT measurements", R4-1816102, 3GPP TSG-RAN WG4 Meeting #89, Spokane, Washington, USA, Agenda 7.11.3, Nov. 12-16, 2018, 49 pages.
PCT/CN2020/136588, International Search Report and Written Opinion, dated Mar. 17, 2021, 9 pages.
Ericsson, "CSSF outside gap for NE-DC operation", R4-1900941, 3GPP TSG-RAN WG4 Meeting #90, Athens, Greece, Agenda Item 6.3.3, Feb. 25-Mar. 1, 2019, 3 pages.

* cited by examiner

METHOD AND APPARATUS FOR SEARCHER RESOURCE SHARING FOR MEASUREMENT WITHOUT MEASUREMENT GAP

TECHNICAL FIELD

This application relates generally to wireless communication systems, and more specifically to cell measurement.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Rel-15 Searcher Resource Sharing

A UE uses an internal searcher of baseband to perform the cell measurement and synchronization, and the limitation of searcher in Rel-15 was assumed to be 2, i.e. UE has 2 searchers in parallel for RRM (radio resource management) measurement.

For measurements without measurement gap (MG), in Rel-15 NR specification (e.g., 3GPP TS 38.133), it has been specified that the sharing table as below (Table 9.1.5.1.1-1 where CSSF is carrier-specific scaling factor, which is used to scale the measurement delay when the UE is configured to monitor multiple measurement objects). The measurement delay scaling determines how the UE shares the searcher resources on measurements for different carriers; e.g. in following table with EN-DC with FR1 only CA, UE will always reserve 1 researcher for PSCC measurement, but share the other 1 searcher among all the SCCs.

TABLE 9.1.5.1.1-1

$CSSF_{outside\_gap,\,1}$ scaling factor for EN-DC mode

| Scenario | $CSSF_{outside\_gap,\,1}$ for FR1 PSCC | $CSSF_{outside\_gap,\,1}$ for FR1 SCC | $CSSF_{outside\_gap,\,1}$ for FR2 PSCC | $CSSF_{outside\_gap,\,1}$ for FR2 SCC where neighbour cell measurement is required $_{Note\,2}$ | $CSSF_{outside\_gap,\,1}$ for FR2 SCC where neighbour cell measurement is not required |
|---|---|---|---|---|---|
| EN-DC with FR1 only CA | 1 | Number of configured FR1 SCell(s) | N/A | N/A | N/A |
| EN-DC with FR2 only intra band CA | N/A | N/A | 1 | N/A | Number of configured FR2 SCells |
| EN-DC with FR1 + FR2 CA (FR1 PSCell) $_{Note\,1}$ | 1 | 2 × (Number of configured SCell(s) − 1) | N/A | 2 | 2 × (Number of configured SCell(s) − 1) |
| EN-DC with FR1 + FR2 CA (FR2 PSCell) $_{Note\,1}$ | N/A | Number of configured SCell(s) | 1 | N/A | Number of configured SCell(s) |

$_{Note\,1}$ Only one NR FR1 operating band and one NR FR2 operating band are included for FR1 + FR2 inter-band EN-DC.
$_{Note\,2}$ Selection of FR2 SCC where neighbour cell measurement is required follows clause 9.2.3.2.

Figure 1:
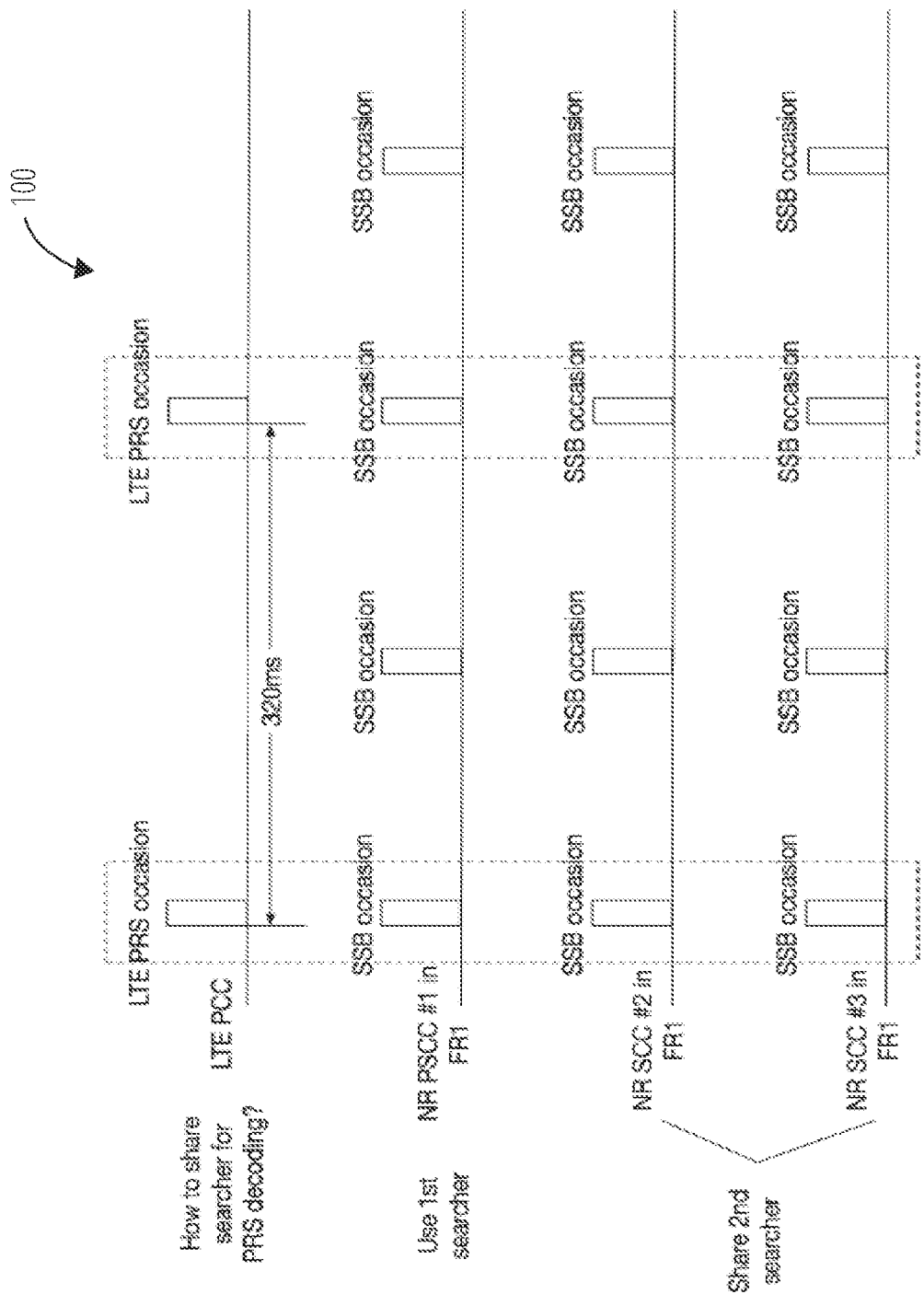
FIG. 1 illustrates a timing diagram in accordance with one embodiment.

FIG. 1 illustrates a timing diagram 100 for a UE configured to monitor multiple measurement objects according to certain embodiments. As discussed in example embodiments below, the UE determines how to share a searcher for PRS decoding when LTE PRS occasions of an LTE PCC align in time with respective SSB occasions of an NR PSCC #1 in FR1, NR SCC #2 in FR1 and NR SCC #3 in FR1. As shown in FIG. 1, the UE may use a table (such as the one shown above) to determine to use the first searcher for the NR PSCC #1 in FR1 and to share the second searcher between the NR SCC #2 in FR1 and the NR SCC #3 in FR1. However, current solutions only consider the case when SSBs on multiple CCs are colliding on the time domain, and tables are applied for the searcher sharing for those SSB based measurement. PRS based positioning measurement are not considered in current solutions, which may make UE behavior unclear if the PRS occasion is colliding with SSBs on time domain.

Thus, certain embodiments herein provide for searcher resource coordination between NR mobility based measurement and LTE PRS measurement without measurement gap in EN-DC or NE-DC mode.

In a one embodiment, positioning based measurement (PRS measurement) may be prioritized if the PRS periodicity is greater than x1 ms (e.g., x1=160) or the PRS periodicity is equal to x1 ms (e.g., x1=160) but some of the PRS occasions are muted.

For EN-DC, the UE may reserve one searcher for positioning based measurement of LTE. Then, for mobility measurement on PSCC, the UE uses y1% (e.g., y1=50) resource of the second searcher (here the resource can be (but not limited to be) occupancy time). If all the NR SCCs are in FR1, the other mobility measurement on NR SCCs equally share the other (100−y1)% resource of the second searcher. If there is at least one NR FR2 SCC, however, the FR2 SCC with neighbor cell measurement uses z1% (e.g., z1=25) resource of the second searcher, and the other SCCs share the (100−y1−z1)% resource of the second searcher.

For NE-DC, the UE may reserve one searcher for positioning based measurement of LIE. Then, for mobility measurement on PCC, the UE uses y2% (e.g., y2=50) resource of the second searcher (here the resource can be (but not limited to be) occupancy time). If all the NR SCCs are in FR1, the other mobility measurement on NR SCCs equally share the other (100−y2)% resource of the second searcher. If there is at least one NR FR2 SCC, however, the FR2 SCC with neighbor cell measurement may use z2% (e.g., z2=25) resource of the second searcher, and the other SCCs share the (100−y2−z2)% resource of the second searcher.

In certain such embodiments, positioning based measurement (PRS measurement) is not prioritized if the PRS periodicity is smaller than x2 ms (e.g., x2=160) or the PRS periodicity is equal to x2 ms x2=160) and no PRS occasion is muted. If all the NR SCCs are in FR1, PRS measurement may equally share the search resource with all FR1 SCCs. If there is at least one NR FR2 SCC, however, PRS measurement may equally share the search resource with all FR1 SCCs and all FR2 SCCs where neighbors cell measurement is not required.

In another embodiment, for searcher resource coordination between NR mobility based measurement and LIE PRS measurement without measurement gap in EN-DC or NE-DC mode, positioning based measurement (PRS measurement) may be prioritized if the PRS periodicity is greater than x3 ms x3=160) or the PRS periodicity is equal to x3 ins (e.g., x3=160) but some of the PRS occasions are muted.

For EN-DC, positioning based measurement of LIE equally shares one searcher with NR PSCC mobility measurement, i.e., for mobility measurement on PSCC the UE uses y3% (e.g. y3=50) resource (here the resource can be (but not limited to be) occupancy time). If all the NR SCCs are in FR1, the other mobility measurement on NR SCCs equally share the resource of the second searcher. If there is at least one NR FR2 SCC, however, the FR2 SCC with neighbor cell measurement uses z3% (e.g. z3=50) resource of the second searcher, and the other SCCs share the (100−z3)% resource of the second searcher.

For NE-DC, positioning based measurement of LTE equally shares one searcher with NR PCC mobility measurement, i.e., for mobility measurement on PCC the UE uses y4% (e.g. y4=50) resource (here the resource can be (but not limited to be) occupancy time). If all the NR SCCs are in FR1, the other mobility measurement on NR SCCs equally share the resource of the second searcher. If there is at least one NR FR2 SCC, however, the FR2 SCC with neighbor cell measurement uses z4% (e.g., z4=50) resource of the second searcher, and the other SCCs share the (100−z4)% resource of the second searcher.

In certain such embodiments, positioning based measurement (PRS measurement) may not be prioritized if the PRS periodicity is smaller than x4 ms (e.g., x4=160) or the PRS periodicity is equal to x4 ms (e.g., x4=160) and no PRS occasion is muted. If all the NR SCCs are in FR1, PRS measurement may equally share the search resource with all FR1 SCCs. If there is at least one NR FR2 SCC, however, PRS measurement may equally share the search resource with all FR1. SCCs and all FR2 SCCs where neighbors cell measurement is not required.

Rel-16 Searcher Resource Sharing

In Rel-16 EN-DC or NE-DC mode, a positioning server may configure two sets of PRS or other RS for positioning on both NR and LTE RATs. Thus, at the UE side, it may be useful to redesign the search resource sharing mechanism to coordinate the positioning measurement and mobility based measurement (as shown in FIG. 2).

Figure 2:
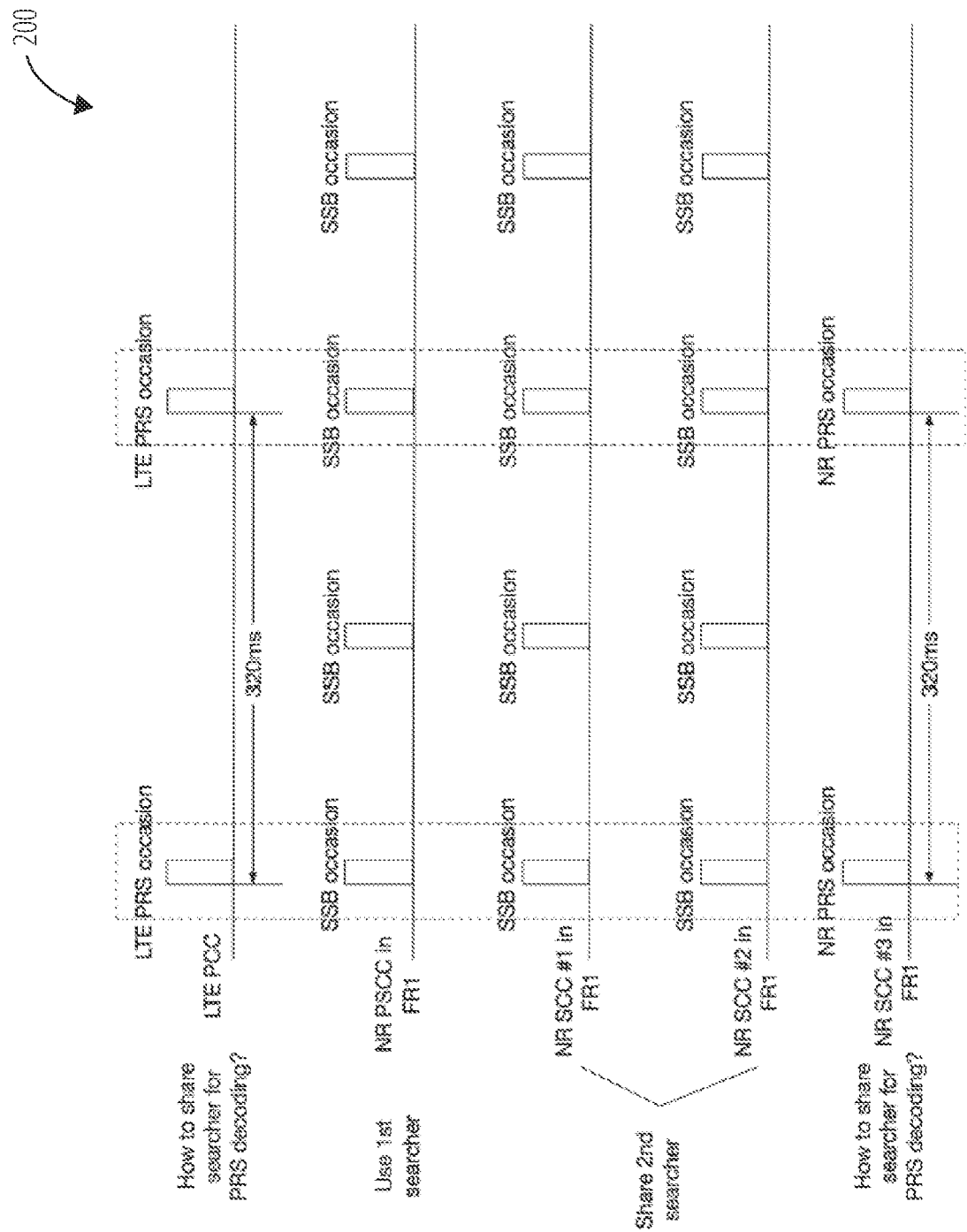
FIG. 2 illustrates a timing diagram in accordance with one embodiment.

FIG. 2 illustrates a timing diagram 200 for a UE configured to monitor multiple measurement objects according to certain embodiments. As discussed in example embodiments below, the UE determines how to share a searcher for PRS decoding when LTE PRS occasions of an LTE PCC align in time with respective SSB occasions of an NR PSCC in FR1, NR SCC #1 in FR1, and NR SCC #2 in FR1, as well as with NR PRS occasions of an NR SCC #3 in FR1. The searcher resource coordination may be performed between PRS measurement and mobility based measurement, or between LIE PRS measurement and NR PRS measurement. In order to implement a concrete UE behavior on baseband, it may be useful to specify which measurement or measurements may be prioritized and how much resource may be reserved for each measurement type.

One embodiment provides searcher resource coordination between NR PRS measurement and LTE PRS measurement without measurement gap in EN-DC or NE-DC mode. The PRS measurement for positioning reference cell may be always prioritized. For example, the UE may be configured to reserve 1 individual searcher for this reference cell. Alternatively, as another example, the UE may be configured to reserve k % (e.g., k=50) resource of searcher for PRS measurement of positioning reference cell, and other PRS measurement may use the (100−k) % resource of this searcher.

If the UE has both LTE positioning reference cell and NR positioning reference cell, the UE may set different priorities. For example, in one embodiment, the UE may prioritize LTE positioning reference cell with greater resource sharing factor. In another embodiment, the UE may prioritize NR positioning reference cell with greater resource sharing factor. In yet another embodiment, the UE may equally share resource between these two positioning reference cells. Further, in another embodiment, the UE may only choose to use one positioning reference cell from these two.

The searcher resource sharing mechanism for LTE and NR. PRS measurement except the reference cell may be as shown in the following table, wherein T1 and T2 is the time domain threshold for LTE PRS measurement and NR. PRS measurement respectively.

| LTE PRS occasion periodicity | NR PRS occasion periodicity | Searcher resources sharing mechanism |
|---|---|---|
| >T1 (e.g. T1 = 160 ms) | >T2 (e.g. T2 = 160 ms) | Equally sharing between LTE PRS and NR PRS measurements(PRS carriers in this row share the equal resource), and have higher sharing factor than other mobility based measurement |
| <T1 (e.g. T1 = 160 ms) | >T2 (e.g. T2 = 160 ms) | Prioritize NR PRS measurement with higher sharing factor |
| >T1 (e.g. T1 = 160 ms) | <T2 (e.g. T2 = 160 ms) | Prioritize LTE PRS measurement with higher sharing factor |
| <T1 (e.g. T1 = 160 ms) | <T2 (e.g. T2 = 160 ms) | Equally sharing between LTE PRS and NR PRS measurements(PRS carriers in this row share the equal resource), and have same sharing factor than other mobility based measurement |

Another embodiment provides searcher resource coordination between NR or LTE PRS measurement and NR mobility measurement without measurement gap in EN-DC or NE-DC mode.

If the UE searcher cannot support parallel measurement on PRS and mobility measurement, the PRS measurement for positioning may be prioritized (with higher resource sharing percentage) than mobility measurement with some conditions. For example, if the PRS periodicity is greater than s (e.g., s=1.60 ms), or if the actual PRS periodicity is greater than s after some PRS muting.

If the UE searcher cannot support parallel measurement on PRS and mobility measurement, the PRS measurement for positioning may equally share the search resource as mobility measurement with some conditions. For example, if the actual PRS periodicity is equal to or smaller than s (e.g., s=160 ms) with possible PRS muting; and/or if PRS muting is not used then actual PRS periodicity is the configured. PRS periodicity.

If NR PRS exist on the same symbol and same carrier (or intra-band carriers) as target mobility RS (SSB or CSI-RS) and PRS have different numerology from mobility RS (UE is not capable of mix-numerology) or PRS have different Rx beam from mobility RS, and PRS and mobility RS are fully overlapped, then the UE may determine different priorities or scaling factors. For example, in one embodiment, the UE may prioritize (with higher resource sharing percentage) the PRS measurement than mobility measurement always. In another embodiment, the UE may prioritize (with higher resource sharing percentage) the PRS measurement than mobility measurement with some condition (e.g., if the PRS periodicity is greater than s (e.g. s=160 ms), or if the actual PRS periodicity is greater than s after some PRS muting). In yet another embodiment, the UE may use scaling factor (to scale the measurement delay and also indicate how many occasions UE can use for each measurement purpose) to determine the occasion usage for PRS measurement and mobility measurement.

If NR PRS exist on the same symbol and same carrier (or maybe intra-band carriers) as target mobility RS (SSB or CSI-RS) and PRS have different numerology from mobility RS (UE is not capable of mix-numerology) or PRS have different Rx beam from mobility RS, and PRS and mobility RS are partially overlapped (e.g. PRS has shorter periodicity than mobility RS periodicity), the UE may: only conduct the PRS measurements which are not colliding with mobility measurement occasions; or conduct the PRS measurement on all PRS occasions, but for the PRS occasion which are colliding with mobility measurement occasions, the resource sharing may be used to decide how much time resource can be used for PRS measurement.

Figure 3:
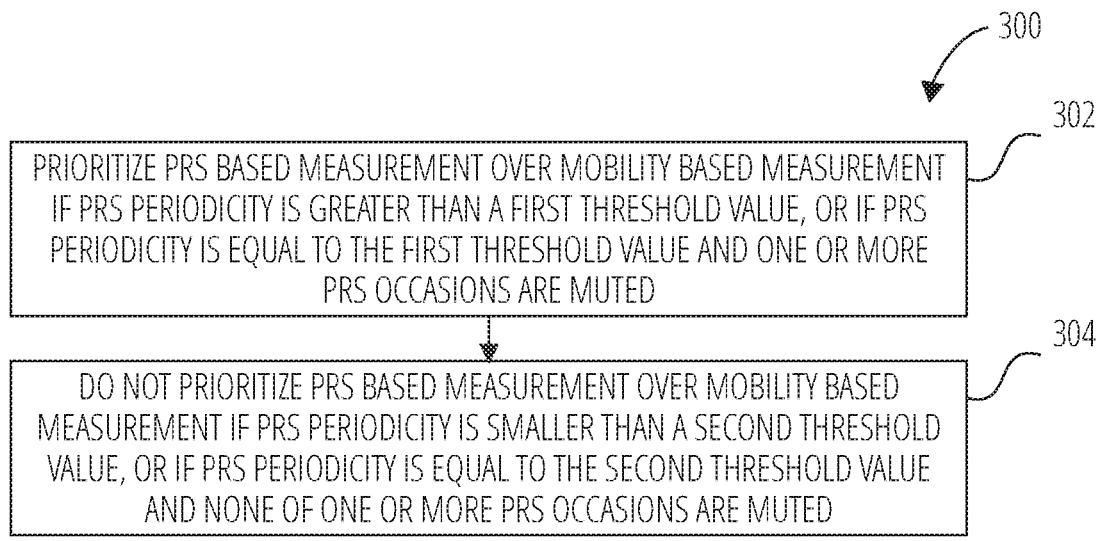
FIG. 3 illustrates a method in accordance with one embodiment.

FIG. 3 is a flowchart illustrating a method 300 for a UE to provide searcher resource coordination between NR mobility based measurement and E-UTRA (LTE) PRS based measurement without measurement gap in E-UTRA-NR dual connectivity (EN-DC) mode or NR-E-UTRA dual connectivity (NE-DC) mode. In block 302, the method 300 prioritizes the PRS based measurement over the mobility based measurement if a PRS periodicity is greater than a first threshold value, or if the PRS periodicity is equal to the first threshold value and one or more PRS occasions are muted. In block 304, the method 300 does not prioritize the PRS based measurement over the mobility based measurement if the PRS periodicity is smaller than a second threshold value, or if the PRS periodicity is equal to the second threshold value and none of the one or more PRS occasions are muted.

Figure 4:
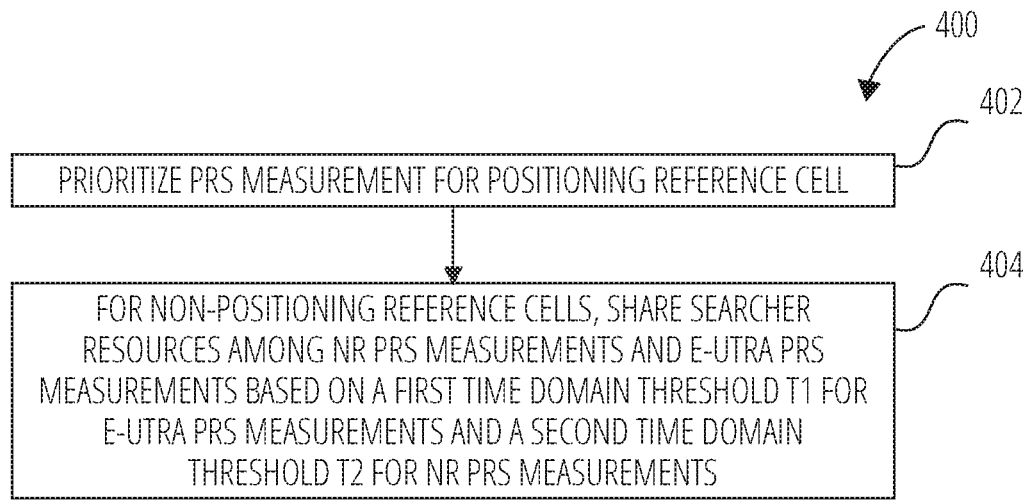
FIG. 4 illustrates a method in accordance with one embodiment.

FIG. 4 is a flowchart of a method 400 for a UE to provide searcher resource coordination between NR PRS measurements and E-UTRA (LTE) PRS measurements without measurement gap in EN-DC mode or NE-DC mode. In block 402, the method 400 prioritizes PRS measurement for a positioning reference cell. In block 404, for non-positioning reference cells, the method 400 shares searcher resources among the NR PRS measurements and the E-UTRA PRS measurements based on a first time domain threshold T1 for the E-UTRA PRS measurements and a second time domain threshold T2 for the NR PRS measurements.

Figure 5:
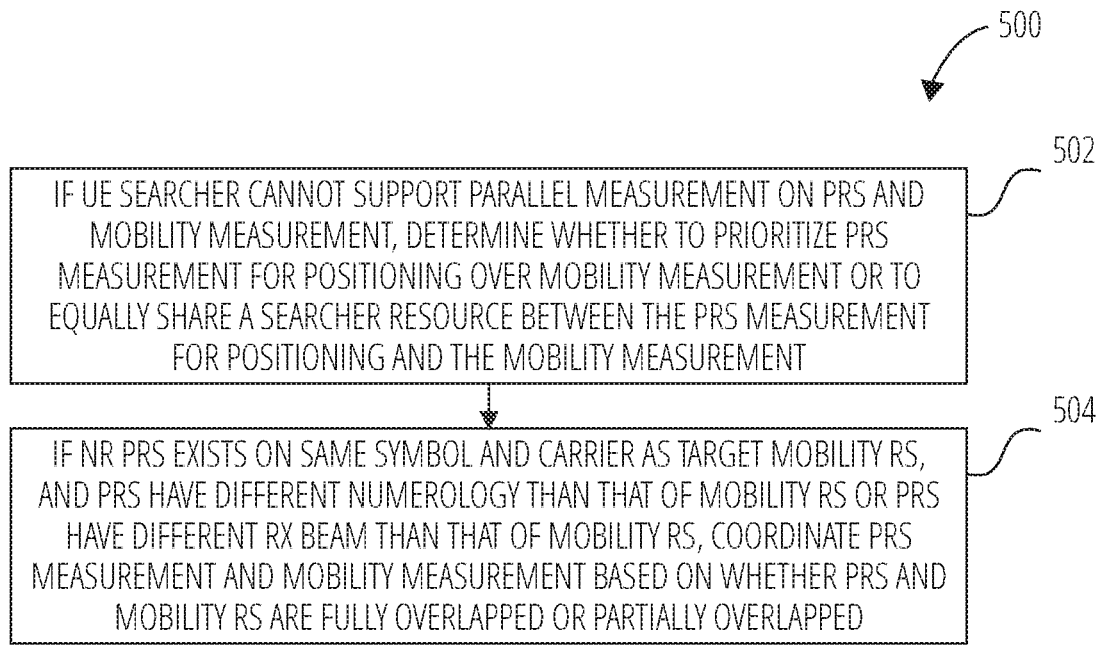
FIG. 5 illustrates a method in accordance with one embodiment.

FIG. 5 is a flowchart of a method 500 for a UE to provide searcher resource coordination between NR PRS measurement or an E-UTRA (LTE) PRS measurement and an NR mobility measurement without measurement gap in EN-DC mode or NE-DC mode. In block 502, if a UE searcher cannot support parallel measurement on PRS and mobility measurement, the method 500 determines whether to prioritize a PRS measurement for positioning over a mobility measurement or to equally share a searcher resource between the PRS measurement for positioning and the mobility measurement. In block 504, if an NR PRS exists on a same symbol and carrier as a target mobility reference signal (RS), and PRS have a different numerology than that of the mobility RS or the PRS have different receive (Rx) beam than that of the mobility RS, the method 500 coordinates the PRS measurement and the mobility measurement based on whether the PRS and the mobility RS are fully overlapped or partially overlapped.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (emote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 6:
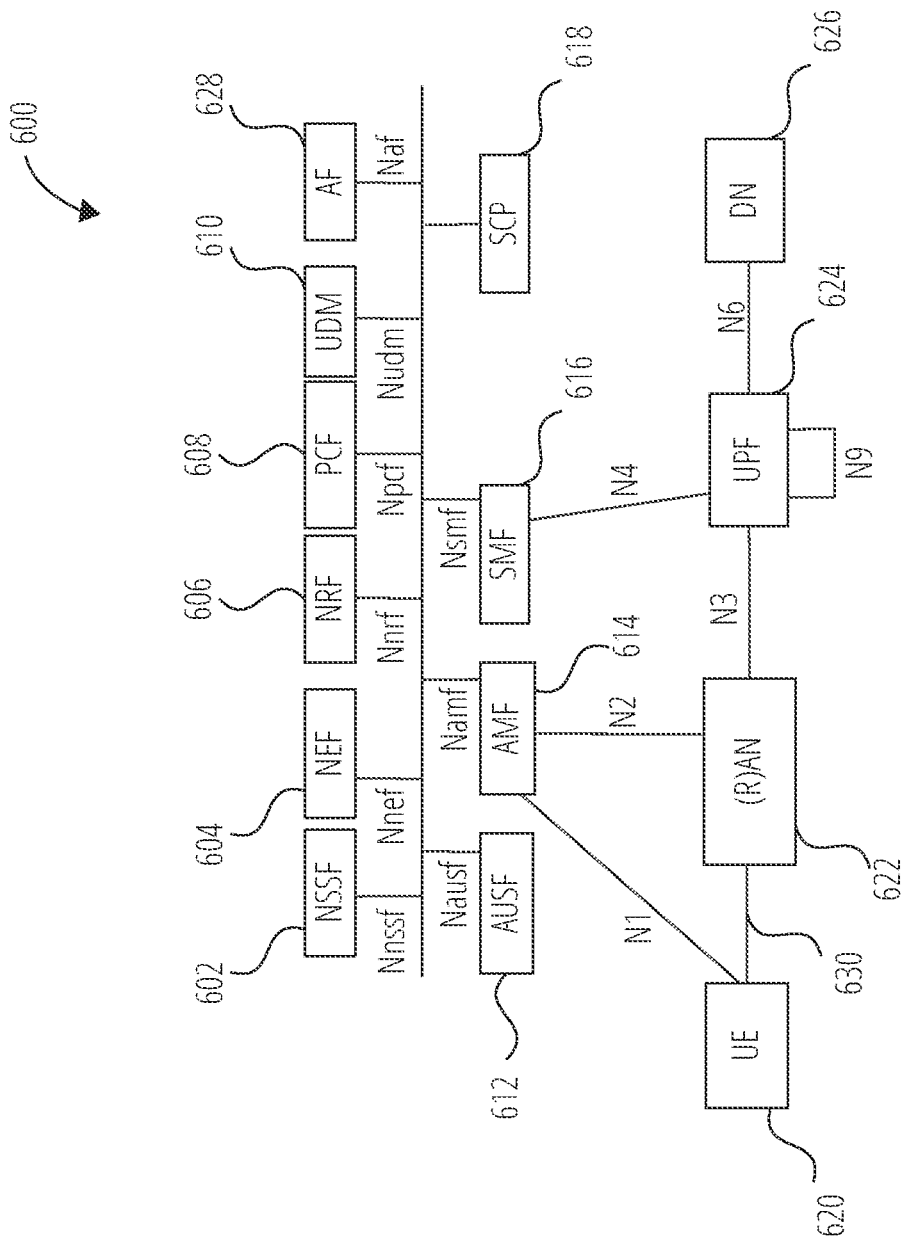
FIG. 6 illustrates an example service based architecture in accordance with certain embodiments.

FIG. 6 illustrates a service based architecture 600 in 5GS according to one embodiment. As described in 3GPP TS 23.501, the service based architecture 600 comprises NFs such as an NSSF 602, a NEF 604, an NRF 606, a PCF 608, a UDM 610, an AUSF 612, an AMF 614, an SMF 616, for communication with a UE 620, a (R)AN 622, a UPF 624, and a DN 626. The NFs and NF services can communicate directly, referred to as Direct Communication, or indirectly via a SCP 618, referred to as Indirect Communication. FIG. 6 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 6 are described below.

The NSSF 602 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 604 supports exposure of capabilities and events. NF capabilities and events may be securely exposed by the NEF 604 (e.g., for 3rd party, Application Functions, and/or Edge Computing). The NEF 604 may store/retrieve information as structured data using a standardized interface (Nudr) to a UDR. The NEF 604 may also secure provision of information from an external application to 3GPP network and may provide for the Application Functions to securely provide information to the 3GPP network (e.g., expected UE behavior, SGLAN group information, and service specific information), wherein the NEF 604 may authenticate and authorize and assist in throttling the Application Functions. The NEF 604 may provide translation of internal-external information by translating between information exchanged with the AF and information exchanged with the internal network function. For example, the NEF 604 translates between an AF-Service-Identifier and internal 5G Core information such as DNN and S-NSSAI. The NEF 604 may handle masking of network and user sensitive information to external AF's according to the network policy. The NEF 604 may receive information from other network functions (based on exposed capabilities of other network functions), and stores the received information as structured data using a standardized interface to a UDR. The stored information can be accessed and re-exposed by the NEF 604 to other network functions and Application Functions, and used for other purposes such as analytics. For external exposure of services related to specific UE(s), the NEF 604 may reside in the HPLMN. Depending on operator agreements, the NEF 604 in the HPLMN may have interface(s) with NF(s) in the VPLMN. When a UE is capable of switching between EPC and 5GC, an SCEF+NEF may be used for service exposure.

The NRF 606 supports service discovery function by receiving an NF Discovery Request from an NF instance or SCP and providing the information of the discovered NF instances to the NF instance or SCP. The NRF 606 may also support P-CSCE discovery (specialized case of AF discovery by SNIT), maintains the NF profile of available NF instances and their supported services, and/or notify about newly registered/updated/deregistered NE instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 608 supports a unified policy framework to govern network behavior. The PCF 608 provides policy rules to Control Plane function(s) to enforce them. The PCF 608 accesses subscription information relevant for policy decisions in a Unified Data Repository (UDR). The PCF 608 may access the UDR located in the same PLMN as the PCF.

The UDM 610 supports generation of 3GPP AKA Authentication Credentials, User Identification Handling (e.g., storage and management of SUN for each subscriber in the 5G system), de-concealment of a privacy-protected subscription identifier (SUCH, access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, SGLAN group management handling, and/or external parameter provisioning (Expected UE Behavior parameters or Network Configuration parameters). To provide such functionality, the UDM 610 uses subscription data (including authentication data) that may be stored in a UDR, in which case a UDM implements the application logic and may not require an internal user data storage and several different UDMs may serve the same user in different transactions. The UDM 610 may be located in the HPLMN of the subscribers it serves, and may access the information of the UDR located in the same PLMN.

The AF 628 interacts with the Core Network to provide services that, for example, support the following: application influence on traffic routing; accessing the NEF 604; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 604 to interact with relevant Network Functions.

The AUSF 612 supports authentication for 3GPP access and untrusted non-3GPP access. The AUSF 612 may also provide support for Network Slice-Specific Authentication and Authorization.

The AMF 614 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AME 614. Regardless of the number of Network functions, in certain embodiments there is only one NAS interface instance per access network between the UE and the CN, terminated at one of the Network functions that implements at least NAS security and Mobility Management. The AMF 614 may also include policy related functionalities.

In addition to the functionalities described above, the AMF 614 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 616 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 616 may include policy related functionalities.

The SCP 618 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group m based on UE identity (e.g., SUPI or IMPI/IMPU). Some or all of the SCP functionalities may be supported in a single instance of an SCP. In certain embodiments, the SCP 618 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 620 may include a device with radio communication capabilities. For example, the UE 620 may comprise a smartphone (e.g., handheld touchscreen mobile computing devices connectable to one or more cellular networks). The UE 620 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 620 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 620 may be configured to connect or communicatively couple with the (R)AN 622 through a radio interface 630, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 620 and the (R)AN 622 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 622 to the UE 620 and a UL transmission may be from the UE 620 to the (R)AN 622. The UE 620 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 622 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 622 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 622) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 620 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 624 may act as an anchor point for intra-RAT and inter-RAT mobility, an external PDU session point of interconnect to the DN 626, and a branching point to support multi-homed PDU session. The UPF 624 may also perform packet routing and forwarding, packet inspection, enforce user plane part of policy rules, lawfully intercept packets (UP collection); traffic usage reporting, perform QoS handling for user plane (e.g. packet filtering, gating, UL/DL, rate enforcement), perform Uplink Traffic verification (e.g., SDF to QoS flow mapping), transport level packet marking in the uplink and downlink, and downlink packet buffering and downlink data notification triggering. The UPF 624 may include an uplink classifier to support routing traffic flows to a data network. The DN 626 may represent various network operator services, Internet access, or third party services. The DN 626 may include, for example, an application server.

Figure 7:
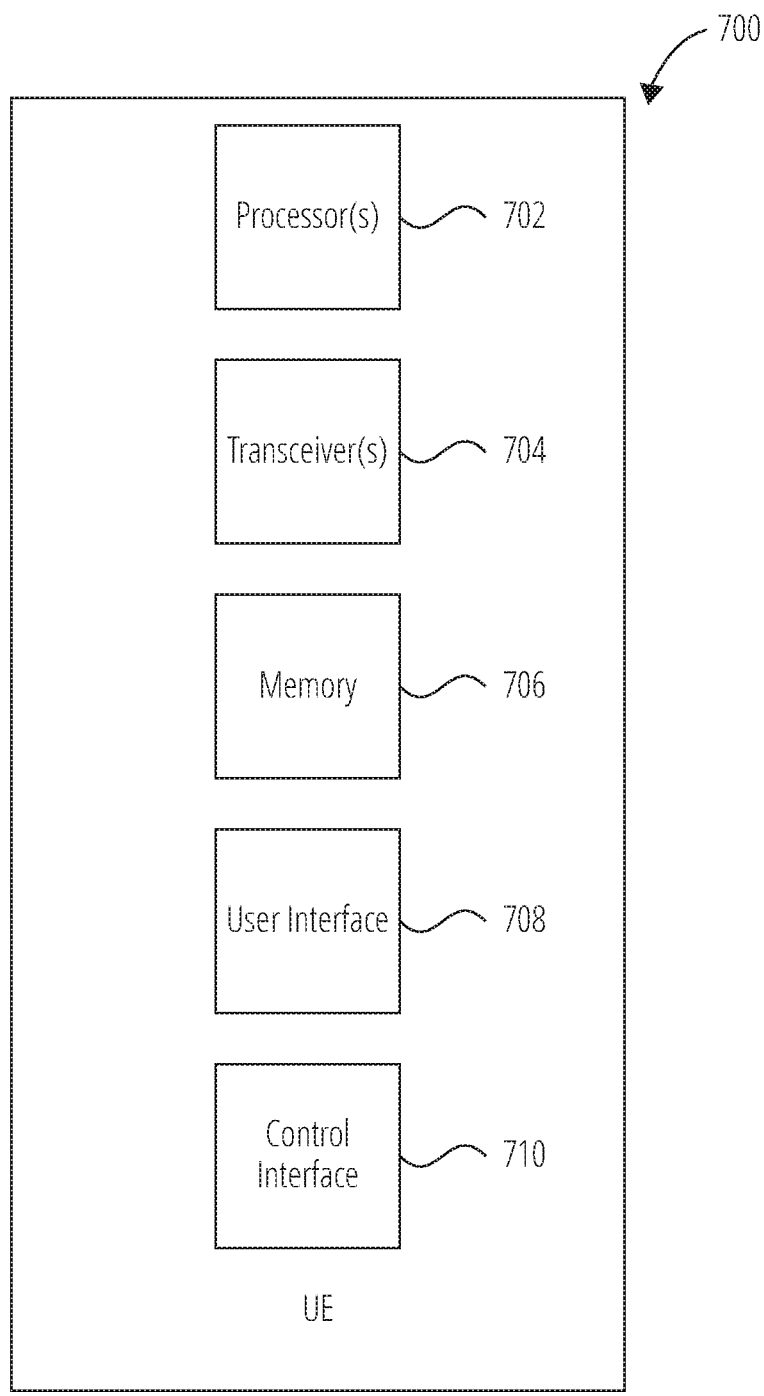
FIG. 7 illustrates a UE in accordance with one embodiment.

FIG. 7 is a block diagram of an example UE 700 configurable according to various embodiments of the present disclosure, including by execution of instructions on a computer-readable medium that correspond to any of the example methods and/or procedures described herein. The UE 700 comprises one or more processor 702, transceiver 704, memory 706, user interface 708, and control interface 710.

The one or more processor 702 may include, for example, an application processor, an audio digital signal processor, a central processing unit, and/or one or more baseband processors. Each of the one or more processor 702 may include internal memory and/or may include interface(s) to communication with external memory (including the memory 706). The internal or external memory can store software code, programs, and/or instructions for execution by the one or more processor 702 to configure and/or facilitate the UE 700 to perform various operations, including operations described herein. For example, execution of the instructions can configure the UE 700 to communicate using one or more wired or wireless communication protocols, including one or more wireless communication protocols standardized by 3GPP such as those commonly known as 5G/NR, LTE. LTE-A, UMTS, HSPA, GSM, GPRS, EDGE, etc., or any other current or future protocols that can be utilized in conjunction with the one or more transceiver 704, user interface 708, and/or control interface 710. As another example, the one or more processor 702 may execute program code stored in the memory 706 or other memory that corresponds to MAC, RLC, PDCP, and RRC layer protocols standardized by 3GPP (e.g., for NR and/or LTE). As a further example, the processor 702 may execute program code stored in the memory 706 or other memory that, together with the one or more transceiver 704, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 706 may comprise memory area for the one or more processor 702 to store variables used in protocols, configuration, control, and other functions of the UE 700, including operations corresponding to, or comprising, any of the example methods and/or procedures described herein. Moreover, the memory 706 may comprise non-volatile memory (e.g., flash memory), volatile memory (e.g., static or dynamic RAM), or a combination thereof. Furthermore, the memory 706 may interface with a memory slot by which removable memory cards in one or more formats (e.g., SD Card, Memory Stick, Compact Flash, etc.) can be inserted and removed.

The one or more transceiver 704 may include radio-frequency transmitter and/or receiver circuitry that facilitates the UE 700 to communicate with other equipment supporting like wireless communication standards and/or protocols. For example, the one or more transceiver 704 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 702. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RE circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RE circuitry, solely in the FEM, or in both the RE circuitry and the FEM circuitry. In some embodiments, the FEM circuitry may include a TX/RX switch to switch between transmit mode and receive mode operation.

In some exemplary embodiments, the one or more transceiver 704 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 702 to implement a PHY layer based on OFDM, OFDMA, and/or SC-FDMA technologies, such as described herein with respect to other figures.

The user interface 708 may take various forms depending on particular embodiments, or can be absent from the UE 700. In some embodiments, the user interface 708 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 700 may comprise a tablet computing device including a larger touchscreen display. In such embodiments, one or more of the mechanical features of the user interface 708 may be replaced by comparable or functionally equivalent virtual user interface features e.g., virtual keypad, virtual buttons, etc.) implemented using the touchscreen display, as familiar to persons of ordinary skill in the art. In other embodiments, the UE 700 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 700 having a touch screen display are capable of receiving user inputs, such as inputs related to exemplary methods and/or procedures described herein or otherwise known to persons of ordinary skill in the art.

In some exemplary embodiments of the present disclosure, the UE 700 may include an orientation sensor, which can be used in various ways by features and functions of the UE 700. For example, the UE 700 can use outputs of the orientation sensor to determine when a user has changed the physical orientation of the UE 700's touch screen display. An indication signal from the orientation sensor can be available to any application program executing on the UE 700, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 710 may take various forms depending on particular embodiments. For example, the control interface 710 may include an RS-232 interface, an RS-485 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1260 can comprise an IEEE 802.3 Ethernet interface such as described above. In some embodiments of the present disclosure, the control interface 710 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 700 may include more functionality than is shown in FIG. 7 including, for example, a video and/or still-image camera, microphone, media player and/or recorder, etc. Moreover, the one or more transceiver 704 may include circuitry for communication using additional radio-frequency communication standards including Bluetooth, GPS, and/or others. Moreover, the one or more processor 702 may execute software code stored in the memory 706 to control such additional functionality. For example, directional velocity and/or position estimates output from a GPS receiver can be available to any application program executing on the UE 700, including various exemplary methods and/or computer-readable media according to various exemplary embodiments of the present disclosure.

Figure 8:
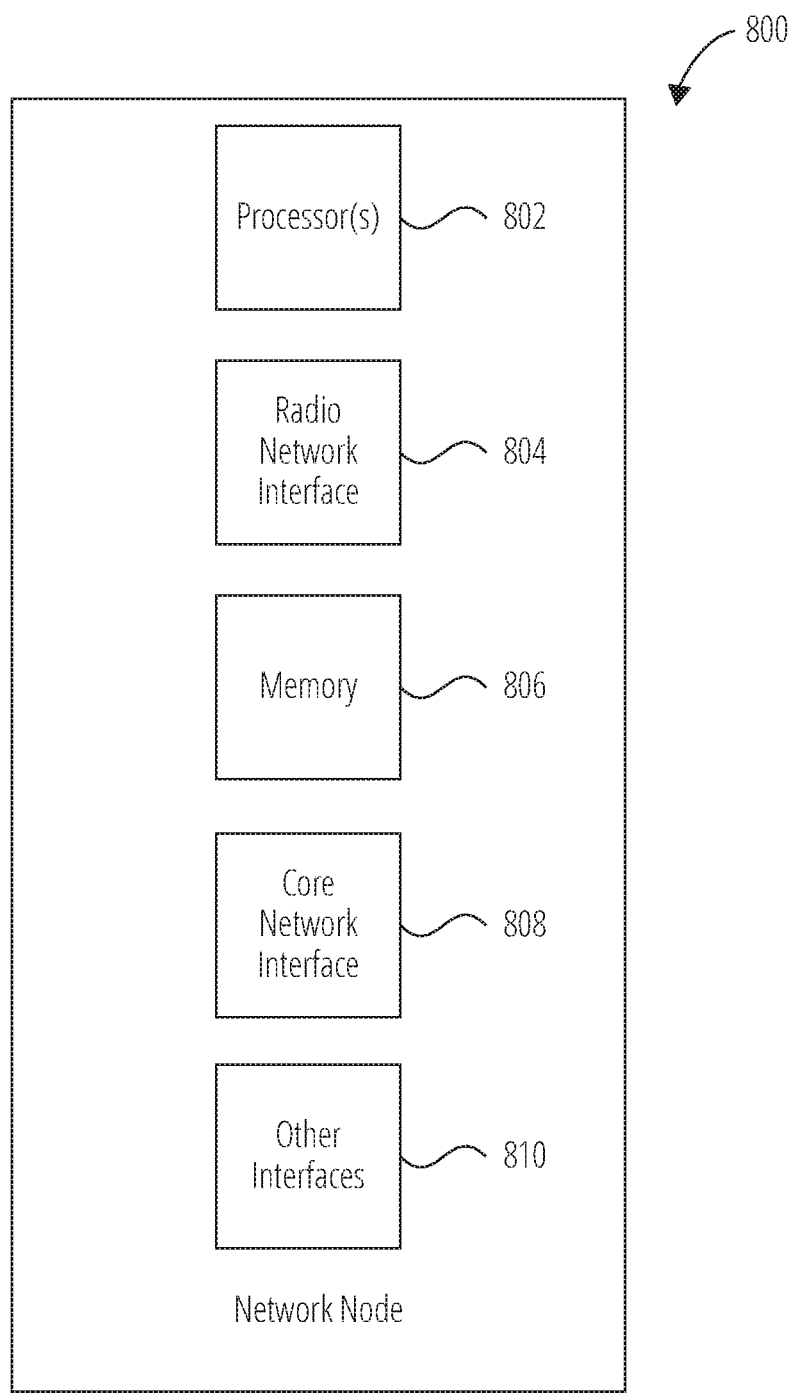
FIG. 8 illustrates a network node in accordance with one embodiment.

FIG. 8 is a block diagram of an example network node 800 configurable according to various embodiments of the present disclosure, including by execution of instructions on a computer-readable medium that correspond to any of the example methods and/or procedures described herein.

The network node 800 includes a one or more processor 802, a radio network interface 804, a memory 806, a core network interface 808, and other interfaces 810. The network node 800 may comprise, for example, a base station, eNB, gNB, access node, or component thereof.

The one or more processor 802 may include any type of processor or processing circuitry and may be configured to perform an of the methods or procedures disclosed herein. The memory 806 may store software code, programs, and/or instructions executed by the one or more processor 802 to configure the network node 800 to perform various operations, including operations described herein. For example, execution of such stored instructions can configure the network node 800 to communicate with one or more other devices using protocols according to various embodiments of the present disclosure, including one or more methods and/or procedures discussed above. Furthermore, execution of such stored instructions can also configure and/or facilitate the network node 800 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 804 and the core network interface 808. By way of example and without limitation, the core network interface 808 comprise an S1 interface and the radio network interface 804 may comprise a Uu interface, as standardized by 3GPP. The memory 806 may also store variables used in protocols, configuration, control, and other functions of the network node 800. As such, the memory 806 may comprise non-volatile memory (e.g., flash memory, hard disk, etc.), volatile memory (e.g., static or dynamic RAM), network-based (e.g., "cloud") storage, or a combination thereof.

The radio network interface 804 may include transmitters, receivers, signal processors, ASICs, antennas, beamforming units, and other circuitry that enables network node 800 to communicate with other equipment such as, in some embodiments, a plurality of compatible user equipment (UE). In some embodiments, the network node 800 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 804 may include a PITY layer based on OFDM, OFDMA, and/or SC-TDMA technologies. In some embodiments, the functionality of such a PHY layer can be provided cooperatively by the radio network interface 804 and the one or more processor 802.

The core network interface 808 may include transmitters, receivers, and other circuitry that enables the network node 800 to communicate with other equipment in a core network such as, in some embodiments, circuit-switched (CS) and/or packet-switched. Core (PS) networks. In some embodiments, the core network interface 808 may include the S1 interface standardized by 3GPP. In some embodiments, the core network interface 808 may include one or more interfaces to one or more SGWs, MMES, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 808 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 810 may include transmitters, receivers, and other circuitry that enables the network node 800 to communicate with external networks, computers, databases, and the like for purposes of operations, administration, and maintenance of the network node 800 or other network equipment operably connected thereto.

Examples

For one or more embodiments, at least one of the components set forth in one or more of the preceding figures may be configured to perform one or more operations, techniques, processes, and/or methods as set forth in the examples below. For example, baseband circuitry or other processors or processing circuitry as described herein may be configured to operate in accordance with one or more of the examples set forth below. For another example, circuitry associated with a HE, base station, network element, etc. as described above in connection with one or more of the preceding figures may be configured to operate in accordance with one or more of the examples set forth in the examples below.

Example 1 may include an apparatus comprising means to perform one or more elements of a method described herein.

Example 2 may include one or more non-transitory computer-readable media comprising instructions to cause an electronic device, upon execution of the instructions by one or more processors of the electronic device, to perform one or more elements of a method or process described herein.

Example 3 may include an apparatus comprising logic, modules, or circuitry to perform one or more elements of a method or process described herein.

Example 4 may include a method, technique, or process as described in or related to any of examples 1-3, or portions or parts thereof.

Example 5 may include an apparatus comprising: one or more processors and one or more computer-readable media comprising instructions that, when executed by the one or more processors, cause the one or more processors to perform the method, techniques, or process as described in or related to any embodiments herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a user equipment (UE) to provide searcher resource coordination between new radio (NR) mobility based measurement and Evolved Universal Terrestrial Radio Access (E-UTRA) positioning reference signal (PRS) based measurement without measurement gap in E-UTRA-NR dual connectivity (EN-DC) mode or NR-E-UTRA dual connectivity (NE-DC) mode, the method comprising:
    prioritizing the PRS based measurement over the mobility based measurement if a PRS periodicity is greater than a first threshold value, or if the PRS periodicity is equal to the first threshold value and one or more PRS occasions are muted; and
    not prioritizing the PRS based measurement over the mobility based measurement if the PRS periodicity is smaller than a second threshold value, or if the PRS periodicity is equal to the second threshold value and none of the one or more PRS occasions are muted.

2. The method of claim 1, wherein prioritizing the PRS based measurement over the mobility based measurement comprises, for the EN-DC mode:
    reserving a first searcher resource for the PRS based measurement; and
    for the mobility based measurement on a primary secondary component carrier (PSCC), using a first percentage of a second searcher resource.

3. The method of claim 2, further comprising:
    if one or more NR secondary component carriers (SCCs) are in a first frequency range (FR1), and none of the NR SCCs are in a second frequency range (FR2), equally sharing a first remaining percentage of the second searcher resource among other mobility based measurements on the NR SCCs; and
    if at least one NR FR2 SCC is in the FR2, using a second percentage of the second searcher resource for FR2 SCC with neighbor cell measurement, and sharing a second remaining percentage of the second searcher resource among other SCCs in FR1 and FR2.

4. The method of claim 1, wherein prioritizing the PRS based measurement over the mobility based measurement comprises, for the NE-DC mode:
    reserving a first searcher resource for the PRS based measurement; and
    for the mobility based measurement on a primary component carrier (PCC), using a first percentage of a second searcher resource.

5. The method of claim 4, further comprising:
    if one or more NR secondary component carriers (SCCs) are in a first frequency range (FR1), and none of the NR SCCs are in a second frequency range (FR2), equally sharing a first remaining percentage of the second searcher resource among other mobility based measurements on the NR SCCs; and
    if at least one NR FR2 SCC is in the FR2, using a second percentage of the second searcher resource for FR2 SCC with neighbor cell measurement, and sharing a second remaining percentage of the second searcher resource among other SCCs in FR1 and FR2.

6. The method of claim 4, wherein the second searcher resource comprises an occupancy time.

7. The method of claim 1, wherein prioritizing the PRS based measurement over the mobility based measurement comprises, for the EN-DC mode, sharing a first searcher resource equally among the PRS based measurement and an NR primary secondary component carrier (PSCC) mobility measurement.

8. The method of claim 7, further comprising:
    if one or more NR secondary component carriers (SCCs) are in a first frequency range (FR1), and none of the NR SCCs are in a second frequency range (FR2), equally sharing a second searcher resource among other mobility based measurements on the NR SCCs; and
    if at least one NR FR2 SCC is in the FR2, using a percentage of the second searcher resource for FR2 SCC with neighbor cell measurement, and sharing a remaining percentage of the second searcher resource among other SCCs in FR1 and FR2.

9. The method of claim 7, wherein prioritizing the PRS based measurement over the mobility based measurement comprises, for the NE-DC mode, sharing the first searcher resource equally among the PRS based measurement and an NR primary component carrier (PCC) mobility measurement.

10. The method of claim 9, further comprising:
    if one or more NR secondary component carriers (SCCs) are in a first frequency range (FR1), and none of the NR SCCs are in a second frequency range (FR2), equally sharing a second searcher resource among other mobility based measurements on the NR SCCs; and
    if at least one NR FR2 SCC is in the FR2, using a percentage of the second searcher resource for FR2 SCC with neighbor cell measurement, and sharing a remaining percentage of the second searcher resource among other SCCs in FR1 and FR2.

11. The method of claim 7, wherein the first searcher resource comprises an occupancy time.

12. The method of claim 1, wherein not prioritizing the PRS based measurement over the mobility based measurement comprises:
    if one or more NR secondary component carriers (SCCs) are in a first frequency range (FR1), and none of the NR SCCs are in a second frequency range (FR2), equally sharing searcher resources among the PRS based measurement and the one or more NR SCCs in FR1; and
    if at least one NR FR2 SCC is in the FR2, equally sharing the searcher resources among the PRS based measurement, the one or more NR SCCs in FR1, and the at least one NR FR2 SCC where neighbor cell measurement is not required.

13. A method for a user equipment (UE) to provide searcher resource coordination between new radio (NR) positioning reference signal (PRS) measurements and Evolved Universal Terrestrial Radio Access (E-UTRA) PRS measurements without measurement gap in E-UTRA-NR dual connectivity (EN-DC) mode or NR-E-UTRA dual connectivity (NE-DC) mode, the method comprising:
- prioritizing PRS measurement for a positioning reference cell; and
- for non-positioning reference cells, sharing searcher resources among the NR PRS measurements and the E-UTRA PRS measurements based on a first time domain threshold T1 for the E-UTRA PRS measurements and a second time domain threshold T2 for the NR PRS measurements.

14. The method of claim 13, wherein prioritizing the PRS measurement for the positioning reference cell comprises reserving one individual searcher for the positioning reference cell.

15. The method of claim 13, wherein prioritizing the PRS measurement for the positioning reference cell comprises reserving a selected percentage of a searcher resource for the positioning reference cell and sharing a remaining percentage of the searcher resource among other PRS measurements for other positioning cells.

16. The method of claim 13, wherein prioritizing the PRS measurement for the positioning reference cell comprises, if there is both an E-UTRAN positioning reference cell and an NR positioning reference cell:
- prioritizing the E-UTRAN positioning reference cell with a greater resource sharing factor; or
- prioritizing the NR positioning reference cell with the greater resource sharing factor; or
- equally sharing a searcher resource between the E-UTRAN positioning reference cell and the NR positioning reference cell; or
- selecting only one of the E-UTRAN positioning reference cell or the NR positioning reference cell as the positioning reference cell.

17. The method of claim 13, wherein for non-positioning reference cells, sharing searcher resources among the NR PRS measurements and the E-UTRA PRS measurements comprises:
- if an E-UTRAN PRS occasion periodicity is greater than T1 and an NR PRS occasion periodicity is greater than T2, equally sharing between the E-UTRAN PRS measurements and the NR PRS measurements, and using a higher sharing factor for the E-UTRAN PRS measurements and the NR PRS measurements than that used for mobility based measurements;
- if the E-UTRAN PRS occasion periodicity is less than T1 and the NR PRS occasion periodicity is greater than T2, prioritizing the NR PRS measurements with a higher sharing factor than that used for the E-UTRAN PRS measurements or mobility based measurements;
- if the E-UTRAN PRS occasion periodicity is greater than T1 and the NR PRS occasion periodicity is less than T2, prioritizing the E-UTRAN PRS measurements with a higher sharing factor than that used for the NR PRS measurements or mobility based measurements; and
- if the E-UTRAN PRS occasion periodicity is less than T1 and the NR PRS occasion periodicity is less than T2, equally sharing between the E-UTRAN PRS measurements and the NR PRS measurements, and using a same sharing factor for the E-UTRAN PRS measurements and the NR PRS measurements as that used for mobility based measurements.

18. A method for a user equipment (UE) to provide searcher resource coordination between new radio (NR) positioning reference signal (PRS) measurement or an Evolved Universal Terrestrial Radio Access (E-UTRA) PRS measurement and an NR mobility measurement without measurement gap in E-UTRA-NR dual connectivity (EN-DC) mode or NR-E-UTRA dual connectivity (NE-DC) mode, the method comprising:
- if a UE searcher cannot support parallel measurement on PRS and mobility measurement, determining whether to prioritize a PRS measurement for positioning over a mobility measurement or to equally share a searcher resource between the PRS measurement for positioning and the mobility measurement; and
- if an NR PRS exists on a same symbol and carrier as a target mobility reference signal (RS), and PRS have a different numerology than that of the mobility RS or the PRS have different receive (Rx) beam than that of the mobility RS, coordinate the PRS measurement and the mobility measurement based on whether the PRS and the mobility RS are fully overlapped or partially overlapped.

19. The method of claim 18, further comprising, if PRS periodicity is greater than a threshold value, or if an actual PRS periodicity is greater than the threshold value after PRS muting, prioritizing the PRS measurement for positioning over the mobility measurement.

20. The method of claim 18, further comprising, if an actual PRS periodicity is equal to or less than a threshold value with possible muting, equally sharing the searcher resource between the PRS measurement for positioning and the mobility measurement.

* * * * *